United States Patent
Putsch et al.

(10) Patent No.: US 10,046,896 B2
(45) Date of Patent: Aug. 14, 2018

(54) FILM PRODUCT FOR PACKAGING PRODUCTS IN SEALED FILM PACKAGES

(75) Inventors: Ingo Putsch, Lengerich (DE); Gerhard Schoone, Ibbenbüren (DE); Raymond Van Hoorn, Münster (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 14/365,632

(22) PCT Filed: Jan. 11, 2012

(86) PCT No.: PCT/EP2012/050381
§ 371 (c)(1),
(2), (4) Date: Aug. 5, 2014

(87) PCT Pub. No.: WO2013/087226
PCT Pub. Date: Jun. 20, 2013

(65) Prior Publication Data
US 2014/0363544 A1 Dec. 11, 2014

(51) Int. Cl.
*B29C 49/04* (2006.01)
*B29C 47/88* (2006.01)
(Continued)

(52) U.S. Cl.
CPC ........ B65D 75/002 (2013.01); B29C 47/0026 (2013.01); B29C 49/04 (2013.01);
(Continued)

(58) Field of Classification Search
CPC ...... B65D 75/002; B65D 65/40; B32B 27/08; B32B 27/327; B32B 27/34; B32B 2439/70; B32B 2307/746; B32B 2307/31; B32B 2307/7246; B32B 2307/7244; B32B 2307/7248; B32B 2307/50; B32B 2307/581; B32B 27/306; B32B 27/308; B32B 27/32; B32B 27/36;
(Continued)

(56) References Cited

U.S. PATENT DOCUMENTS

| | | | | |
|---|---|---|---|---|
| 3,532,780 A | * | 10/1970 | Akimoto | B29C 47/901 264/557 |
| 3,539,669 A | * | 11/1970 | Chein-Ho Wu | B29C 47/8825 264/178 R |
| 3,778,205 A | * | 12/1973 | Turner | B29C 47/8835 425/71 |
| 3,851,028 A | * | 11/1974 | Beyer | B29C 47/882 264/177.19 |

(Continued)

FOREIGN PATENT DOCUMENTS

| | | |
|---|---|---|
| DE | 20318476 | 4/2004 |
| DE | 202005018866 | 2/2006 |

(Continued)

OTHER PUBLICATIONS

ExxonMobil, Exceed 1012 datasheet, 2017.*
(Continued)

*Primary Examiner* — Jeffrey Wollschlager

(57) ABSTRACT

The invention relates to a film product (10) for packing products, particularly liquids (200), pasty and/or pourable materials, in sealed film packages (100), comprising at least two film layers (20a, 20b), wherein the outwardly facing film layer (20a) is thermally stable, and the inwardly facing film layer (20b) is sealable, and both film layers (20a, 20b) are produced in a water-cooled coextrusion blow molding process.

15 Claims, 5 Drawing Sheets

(51) Int. Cl.

| | | |
|---|---|---|
| *B65D 75/00* | (2006.01) | |
| *B29C 47/00* | (2006.01) | |
| *B32B 27/08* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B65D 65/40* | (2006.01) | |
| *B29C 49/22* | (2006.01) | |
| *B29C 47/06* | (2006.01) | |
| *B32B 37/15* | (2006.01) | |
| *B29K 77/00* | (2006.01) | |
| *B29L 9/00* | (2006.01) | |
| *B29L 31/00* | (2006.01) | |

(52) U.S. Cl.
CPC .............. *B29C 49/22* (2013.01); *B32B 27/08* (2013.01); *B32B 27/306* (2013.01); *B32B 27/308* (2013.01); *B32B 27/32* (2013.01); *B32B 27/327* (2013.01); *B32B 27/34* (2013.01); *B32B 27/36* (2013.01); *B65D 65/40* (2013.01); *B29C 47/0057* (2013.01); *B29C 47/06* (2013.01); *B29C 47/065* (2013.01); *B29C 47/883* (2013.01); *B29C 47/8825* (2013.01); *B29C 47/8835* (2013.01); *B29C 47/8895* (2013.01); *B29K 2023/06* (2013.01); *B29K 2077/00* (2013.01); *B29K 2995/0067* (2013.01); *B29K 2995/0069* (2013.01); *B29L 2009/00* (2013.01); *B29L 2031/712* (2013.01); *B32B 37/153* (2013.01); *B32B 2307/31* (2013.01); *B32B 2307/50* (2013.01); *B32B 2307/581* (2013.01); *B32B 2307/7242* (2013.01); *B32B 2307/7244* (2013.01); *B32B 2307/7246* (2013.01); *B32B 2307/7248* (2013.01); *B32B 2307/746* (2013.01); *B32B 2439/06* (2013.01); *B32B 2439/70* (2013.01); *Y10T 428/2826* (2015.01)

(58) Field of Classification Search
CPC ........ B32B 2307/7242; B32B 2439/06; B32B 37/153; B29L 2009/00; B29L 2031/712; B29K 2023/06; B29K 2995/0069; B29K 2995/0067; B29K 2077/00; Y10T 428/2826; B29C 2035/1616; B29C 47/0026; B29C 47/0054; B29C 47/0057; B29C 47/06; B29C 47/065; B29C 47/8825; B29C 47/883; B29C 47/8835; B29C 47/8895; B29C 49/04; B29C 49/22
See application file for complete search history.

(56) References Cited

U.S. PATENT DOCUMENTS

| | | | | |
|---|---|---|---|---|
| 3,892,834 A * | 7/1975 | Pritchard | ................. | B29B 9/065 264/13 |
| 4,203,942 A * | 5/1980 | Sims, Jr. | ............. | B29C 47/0026 264/178 R |
| 4,264,554 A * | 4/1981 | Hale | ........................ | B29B 9/065 264/130 |
| 4,268,583 A * | 5/1981 | Hendy | .................... | B32B 27/18 428/516 |
| 4,557,780 A * | 12/1985 | Newsome | ................ | B32B 27/08 156/244.11 |
| 4,565,738 A * | 1/1986 | Purdy | ..................... | B32B 27/32 428/349 |
| 4,612,245 A * | 9/1986 | Mueller | .............. | B29C 37/0067 427/230 |
| 4,687,688 A * | 8/1987 | Curie | ..................... | B32B 27/08 428/35.2 |
| 4,767,651 A * | 8/1988 | Starczewski | ............ | B32B 27/08 428/35.2 |
| 4,828,915 A * | 5/1989 | Schroeder | ............... | B32B 27/08 264/173.19 |
| 4,862,675 A * | 9/1989 | Curie | ..................... | B32B 27/08 53/440 |
| 4,927,574 A * | 5/1990 | Herrington | ......... | B29C 47/0026 264/179 |
| 5,049,223 A * | 9/1991 | Dais | .................... | B29C 47/0021 156/244.11 |
| 5,084,227 A * | 1/1992 | Vancoppenolle | ....... | B29C 35/16 264/178 R |
| 5,614,297 A * | 3/1997 | Velazquez | ............... | B32B 27/08 428/212 |
| 5,686,173 A * | 11/1997 | Fujii | ...................... | B32B 27/08 428/213 |
| 5,759,675 A * | 6/1998 | Hamada | ............... | B29C 47/0026 264/173.11 |
| 6,379,812 B1 * | 4/2002 | Hofmeister | ............. | B32B 27/28 428/34.1 |
| 6,558,760 B1 * | 5/2003 | Paleari | .................... | B32B 27/32 426/113 |
| 6,562,476 B2 * | 5/2003 | Shepard | ............... | B29C 47/0021 264/173.14 |
| 6,682,825 B1 * | 1/2004 | Kennedy | ................. | B32B 27/08 428/213 |
| 6,699,549 B1 * | 3/2004 | Ueyama | ............... | B29C 47/0026 264/514 |
| 6,726,863 B2 * | 4/2004 | van Lenthe | ........... | B29C 47/902 264/167 |
| 6,790,468 B1 * | 9/2004 | Mize, Jr. | .............. | B65D 75/004 426/129 |
| 6,815,023 B1 * | 11/2004 | Tatarka | ................. | B29C 55/023 264/464 |
| 9,096,040 B2 * | 8/2015 | Kobayashi | ................ | A61J 1/10 |
| 2002/0068137 A1 * | 6/2002 | Paleari | .................. | B29C 66/723 428/34.9 |
| 2003/0087114 A1 * | 5/2003 | Ferri | ....................... | B32B 27/08 428/500 |
| 2007/0026250 A1 * | 2/2007 | Hofmeister | ............. | B32B 27/08 428/474.4 |
| 2007/0082161 A1 * | 4/2007 | Cruz | ......................... | B32B 7/10 428/40.1 |
| 2008/0179780 A1 * | 7/2008 | Broadus | .............. | B29C 47/0026 264/171.27 |
| 2009/0081394 A1 * | 3/2009 | Carew | .................... | B32B 27/08 428/34.8 |
| 2009/0136726 A1 * | 5/2009 | Ishii | ........................ | B32B 27/08 428/212 |
| 2010/0140127 A1 * | 6/2010 | Smith | ................ | B65D 81/2023 206/497 |
| 2010/0260995 A1 * | 10/2010 | Pellegatti | ................ | C08F 10/00 428/220 |
| 2011/0185683 A1 * | 8/2011 | Domenech | .............. | A01F 25/14 53/461 |

FOREIGN PATENT DOCUMENTS

| | | |
|---|---|---|
| DE | 102008062937 | 7/2010 |
| EP | 2233285 | 9/2010 |
| EP | 2351646 | 8/2011 |
| WO | WO 2005/002838 | 1/2005 |
| WO | WO 2011/052776 | 5/2011 |
| WO | WO 2013/087226 | 6/2013 |

OTHER PUBLICATIONS

Request for Examination Dated Jul. 2, 2014 From the German Patent and Trademark Office Re. Application No. 102011056357.1 and Its Translation Into English.
International Preliminary Report on Patentability dated Apr. 15, 2014 From the European Patent Office Re. Application No. PCT/EP2012/050381.

(56) References Cited

OTHER PUBLICATIONS

International Search Report and the Written Opinion dated Jun. 6, 2012 From the European Patent Office Re. Application No. PCT/EP2012/050381 and Its Translation Into English.
Notification of Office Action Dated Jun. 10, 2015 From the State Intellectual Property Office of the People's Republic of China Re. Application No. 201280061907.8 and Its Translation Into English.

* cited by examiner

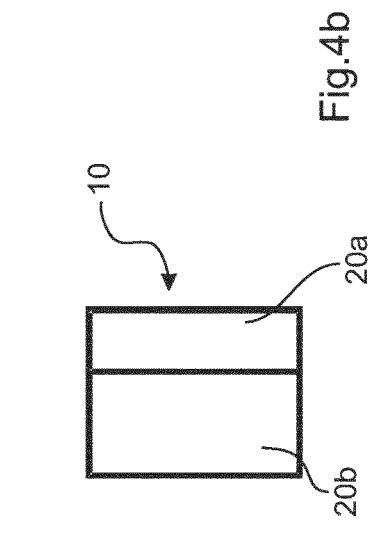
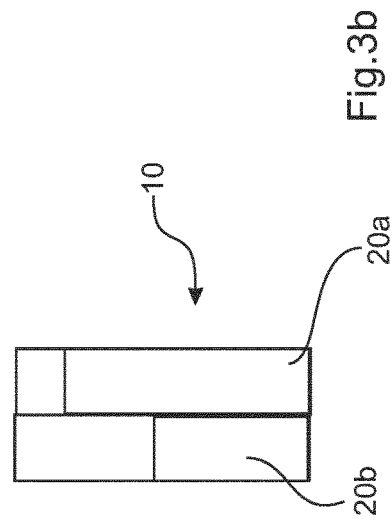
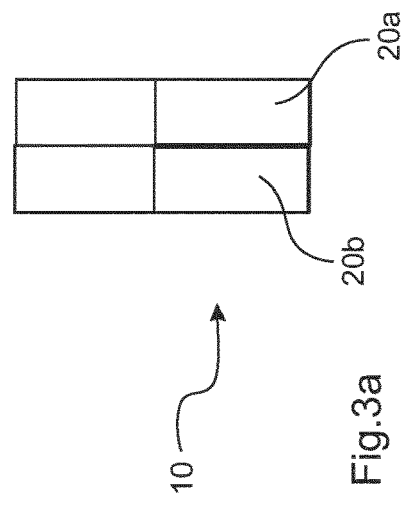
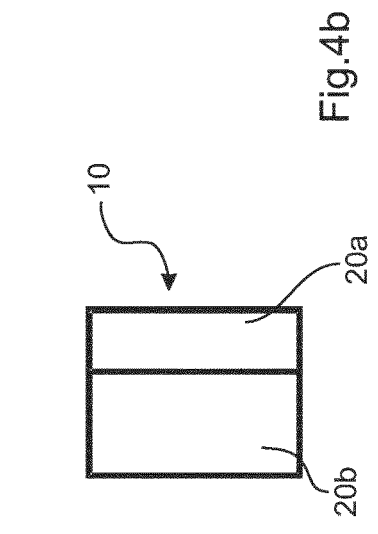

FILM PRODUCT FOR PACKAGING PRODUCTS IN SEALED FILM PACKAGES

RELATED APPLICATIONS

This application is a National Phase of PCT Patent Application No. PCT/EP2012/050381 having International filing date of Jan. 11, 2012, which claims the benefit of priority of European Patent Application No. 11193817.1 filed on Dec. 15, 2011. The contents of the above applications are all incorporated by reference as if fully set forth herein in their entirety.

FIELD AND BACKGROUND OF THE INVENTION

The present invention relates to a film product for the packaging products in sealed film packages, a method for preparing a film product, and a film package with a packaging that is at least partially filled with a product.

In general, it is known that film products are used to store and transport products, particularly liquids, in sealed foil packaging. In this context, frequent use is made of "FFS machines" (Form, Fill, Seal). The most frequently used products are continuous tubing or film webs that can be filled in a shared fill and seal process with general cargo or liquids. Such film packages are often consumer packaging, so that for example detergent or the like can be packaged in such a film package. Particularly in liquid packaging, such film packages are also called "pouches." In order to manufacture such film packaging products in FFS machines, sealing jaws are required, which together seal the film product, especially individual film layers to produce a sealed seam. This sealed seam encloses a storage space inside the film packaging in substantially liquid-tight manner. The sealing jaws are heated to a sealing temperature until a part of the film product fuses or melts. For this purpose, a certain period of contact is needed between the sealing jaws and the film product so that sufficient quantities of heat can be exchanged.

With known devices, care must be taken to ensure that the sealing process does not contaminate the sealing jaws. To guarantee this, either the work is done at relatively low sealing temperatures or the sealing jaws are temporarily covered with Teflon tape. Consequently, either the Teflon strips have to be replaced after certain intervals, or the low sealing temperatures result in relatively long cycle times for creating the seal. In both cases, the productivity of such machines is reduced.

It is already known that "asymmetric film products" are used to provide a heat-sealable film layer and a thermally stable film layer together in as single film product. In the known film products, these two layers are produced together by a laminating process. The disadvantage of this is that both film layers have to be produced separately and then undergo a laminating process. This increases the cost of such asymmetric films significantly, so that they are only rarely used to produce film products for FFS machines. It is also known that coextrusion blow moulding machines that make different film layers in the coextrusion process are also used to produce tubular bags. A general capability of an extrusion blow moulding process is known from DE 10 2009 046 539 A1. Similarly, coextrusion blow moulding can also be performed. The document discloses a "dry coextrusion step", wherein air cooling is provided from the outside and the inside for the extruded tubular film. However, a disadvantage of this coextrusion blow moulding process is that in asymmetric film layer compounds with different melting points, a tendency to roll up occurs, known as the "curl effect". Cooling after leaving the nozzle creates thermally induced stresses in the film product material, which produce a tendency to curl in the film product. Film compounds consisting of different film layers that are produced in this way have only limited use, because they have disadvantages in terms of transparency and surface constitution. This curl effect or tendency to roll also means that they can only be used in FFS machines to a limited degree and/or only at low cycle speeds.

SUMMARY OF THE INVENTION

It is an object of the present invention to overcome the disadvantages described in the preceding, at least partly. In particular, it is an object of the present invention to provide a film product, a film package, and a method that will allow the use of rapid cycle speeds with a film product used in an FFS machine with high quality results.

The object as stated is solved with a film product having the features of claim 1, a method having the features of claim 10, and a foil package having the features of claim 15. Further features and details of the invention will become apparent from the dependent claims, the description and the drawings. It should be noted that features and details that are described in connection with the film product according to the invention of course apply equally in connection with the method according to the invention and the film package according to the invention, and vice versa, so that regarding the disclosure of each individual aspect of the invention, reciprocal reference is and may be made consistently to each of the other aspects.

A film product according to the invention for packaging products, particularly liquids, pasty and/or pourable materials, in sealed film packages comprises at least two film layers. It is characterized in that the outward facing film layer is thermally stable and the inward facing film layer is sealable. Moreover, the two film layers or all film layers of such a film product are manufactured in a water-cooled coextrusion blow moulding process.

With a film product according to the invention, the advantages of an asymmetric arrangement of the film layers are combined with the low-cost production methods of co-extrusion blow moulding. This is made possible according to the invention by the fact that co-extrusion blow moulding is a water-cooled co-extrusion blow moulding process. Consequently, the film product may be exposed to very rapid cooling rates, essentially shock cooling, after it leaves the extrusion die. As a consequence of this manner of cooling, with very rapid cooling rates, little or no thermally induced stresses are created in the material composite of film layers. With the reduction of these internal stresses, the rolling tendency or curl effect is also minimised. Thus, the low-cost coextrusion blow moulding method may be used in this way to manufacture the desired film composite of an asymmetric arrangement of film layers in a single process step without encountering the disadvantages that such a coextrusion blow moulding method conventionally entails in an asymmetric film composite variant. This combination enables costs to be reduced because only a single manufacturing step is required for the film product. The film product is manufactured simultaneously with the desired high quality and, unlike expensive laminating processes in particular, is manufacturable in a single process step by coextrusion blow moulding.

Surprisingly, it has been found that with a film product according to the invention, at least the thermally stable film layer facing outwards manifests significant advantages, including with regard to the transparency and gloss thereof. However, this applies particularly for all film layers of a film product according to the invention.

A film product according to the invention may particularly be used in FFS machines. Since a thermally stable layer is provided on the outside and a sealable film layer is provided on the inside, it is possible to work with relatively high sealing temperatures, because the thermally stable layer prevents or reduces adhesion of the material to the sealing jaws of the FFS machine. Such high sealing temperatures enable the cycle times of the FFS machine to be accelerated. Moreover, coating of the sealing jaws, particularly with a Teflon tape may advantageously be dispensed with. As a result, besides faster cycle times the continuous operation time of the sealing jaws is prolonged. Of course, a plurality of film layers may also be used, wherein at least the outer and the inner film layers are formed according to the method of the invention.

With regard to a film product according to the invention, the term "thermally stable" is understood to mean that such material will undergo very little or no melting in the range of the sealing temperatures. This may be assured for example by polyamide or polyamide variants. A "sealable" film layer is understood to refer to a film layer that is deformable at the desired sealing temperatures and, in particular, melts. This means in particular that there is a significant difference between the respective melting temperatures of a sealable and a thermally stable film layer. For example, melting temperatures for the thermally stable film layer, particularly polyamide, are expected to be between about 130° C. and about 220° C. The sealable film layer is particularly polyethylene or similar materials, and the melting temperature thereof is expected to be between about 90° C. and about 120° C., for example.

The term water-cooled coextrusion blow moulding process is used to describe a process that may also be referred to as upside-down wet-process. In such a process, an extrusion moulding is formed to extend from the top downwards, and in particular is water-cooled from the outside and/or the inside. The water preferably comes into direct contact with the material of the respective film layer for cooling purposes. The molten film layer material exits the die of such a coextrusion blow moulding preferably at a temperature in the range between about 180° C. and about 260° C. Subsequently, water preferably in a temperature range between about 5° C. and about 45° C. is used for cooling.

With a film product according to the invention, the reduced curl effect or reduced tendency may also result in improved running properties in the FFS machines. Taken together, the individual film layers preferably form a total thickness of the film product in the range between about 20 μm and about 1,000 μm, particularly in the region of about 100 μm.

The film product may be produced in a wide range of different versions, and in particular is a transparent film product. However, it goes without saying that the individual film layers may contribute a wide range of different properties that correspondingly vary the nature of the film product as a whole, e.g., in terms of the colour or barrier properties thereof. The film product of the invention may be processed further, to make "pouches" on FFS machines, for example. More complex film packages, such as stand-up pouches, are also producible within the scope of the present invention by using a film product according to the invention.

The value of such a film product may be further enhanced during filling, or even prior to filling, by applying printing. In particular, with the tendency to roll and the curl effect minimised appropriately, a film product according to the invention may undergo printing actions at faster web speeds and with greater process reliability. This is the more advantageous since it is to be expected that the printed image will suffer little or no distortion on the film product.

It may be advantageous if an adhesion promoting layer is arranged between the thermally stable film layer and the sealable film layer in a film product according to the invention. An adhesion promoter in the form of an adhesion promoting layer is understood to be a material that forms a bond between individual layer materials that would otherwise not bond well. Particularly if many more than two film layers are provided, it may be advantageous if an adhesion promoting layer is interposed between each two adjacent film layers. For example, such an adhesion promoting layer may comprise two different sides, so that a polar bond is enabled on one side thereof, and a non-polar bond is enabled on the other side. The adhesion promoting layer is preferably also interposed as a third material layer between the two outer film layers by the coextrusion blow moulding process.

It is also advantageous if in a film product according to the invention the thermally stable film layer includes at least one of the following materials:
polyamide (PA)
polyester or polyethylene terephthalate (PET)
polybutylene terephthalate (PBT)
polypropylene (PP)
high density polyethylene (PE)

The aforegoing, not comprehensive list describes possible materials only on the basis of examples. Preferably, a variant is used in which polyamide is provided at least in part of the thermally stable film layer.

It may also be advantageous if in a film product according to the invention the sealable film layer comprises at least one of the following materials:
ethylene vinyl acetate (EVA)
Surlyn (ionomer)
ethylene acrylic acid (EAA)
ethylene methylacrylate (EMA)
mLL (metallocene linear low density PE)
LL (linear low density PE)
Bynel The preceding list of materials also represents only a non-exhaustive selection of materials that may possibly be used for the sealable film layer. In this case, polyethylene or a material having polymer components with ethylene is preferred.

A further advantage may be gained if a film product according to the invention includes at least one film layer having increased barrier properties, measured particularly in terms of permeability per unit area and time, with regard to at least one of the following substances:
oxygen ($O_2$)
air
carbon dioxide ($CO_2$)
flavouring agents
fragrances
water vapour
components of the filler material This last also is a non-comprehensive enumeration of possible barrier properties. And the film layer in question may be the thermally stable layer or the sealable layer, or even an additional film layer. If a plurality of different barrier properties is desired, then a plurality of film layers may also be interposed correspondingly between the innermost and the outermost film layers. At the same time, individual film layers may also offer more than one barrier property. Preferably, however, a flexible combination of the individual properties is created by judicious selection of various film layers containing the materials required.

It may also be advantageous if at least one film layer in a film product according to the invention has one of the following properties:
colour property,
antiblock property,
anti-friction property,
antioxidant property,
UV protection,
puncture resistance,
rigidity,
toughness.

This list is also non-exhaustive. The colour property is intended to refer to dyeing of one of the film layers. These properties too may be created using the existing outer film layers, that is to say the thermally stable film layer and the sealable film layer, or by separate, additional film layers. In this context, the respective properties may relate to both the visual and haptic perceptions of the film product as well as the handling properties thereof in the subsequent processing workflow, particularly when working with an FFS machine.

It may be of further advantage if in a film product according to the invention at least one additional film layer having an additional property is arranged between the two outer film layers, particularly between an adhesion promoting layer and the innermost film layer. An extra film layer may be provided for example with one of the properties listed in the two preceding two paragraphs. Providing an additional film layer has the advantage that the desired properties of sealability and thermal stability of the two outermost film layers are not negatively affected by this additional property. Thus, a film product according to the invention offers enormous versatility of application, since it is possible to create film products that lend themselves to a very wide range possible uses by interposing additional film layers having appropriately selected properties. Moreover, the cost of such a film product is reduced, since the same process, that is to say a coextrusion blow moulding process, can be used in all cases, that is to say a substantially unlimited number of additional film layers. In particular, a plurality of film layers, e.g., ten or more film layers, are superposed.

It may also be advantageous if in a film product according to the invention the foil layers together have a thickness between about 20 µm and about 1,000 µm, particularly between about 50 µm and about 200 µm. Thicknesses of about 100 µm are most preferable. Thus a general geometric framework is created in which film products according to the invention may be arranged. In this framework, coextrusion blow moulding can be carried out particularly easily and inexpensively.

A further advantage may be gained if the film product according to the invention is constructed as an endless tubular bag. The film web is preferably an endless tubular bag that has been cut open along its longitudinal extension.

A further object of the present invention is a method for producing a film product having at least two film layers, wherein one film layer is thermally stable and one film layer is heat-sealable. Such a method is noteworthy for the fact that the film product is produced by water-cooled co-extrusion blow moulding. A method according to the invention results in particular in a film product according to the present invention, so that the same advantages may be obtained as have been described thoroughly with reference to a film product according to the invention.

An inventive method may be refined in such manner that water in a range between about 5° C. and 45° C. serves as a coolant. This enables the material to be cooled to a range below about 100° C. after it leaves the extrusion die at a temperature of about 180° C. to 260° C. Temperatures below about 80° C. and particularly between about 40° C. and about 70° C. are preferably provided as a target cooling temperature. In this process, it should be noted that the cooling creates a temperature gradient within the material between the core material and the surface of the material. The preceding residual temperatures are particularly the maximum temperatures in the material in each case. The water for cooling may be modified for example by the addition of additives for lowering surface tension so that the surface of the film product is wetted more efficiently. In particular, surfactants such as detergents may be used as modifiers of the coolant water. Softened and/or demineralised water (distilled water) may also be used in the present invention.

A further advantage may be gained if air is exchanged inside the coextrusion mould as part of the method according to the invention. This improves heat dissipation, so that the cooling effect is further improved without additional cooling from the outside. It is also possible in a process according to the invention for cooling to take place with air or water inside a co-extrusion mould. The additional cooling, particularly air cooling, serves to further improve cooling, so that a lower final temperature after cooling may be attained at the same extrusion speed.

It is also possible that the film product according to the present invention is produced in a method according to the invention. This results in the same advantages already explained in detail in the preceding.

Another object of the present invention is a film package comprising a packaging space that is sealed with at least one liquid-tight seal and at least partly filled with a product, particularly a liquid. A film package according to the invention is noteworthy in that the packaging space is surrounded by at least two film layers that are prepared in a water-cooled coextrusion blow moulding process, wherein the outwardly facing film layer is thermally stable and the film layer facing inward toward the packaging space is heat sealable. The term packaging space may also be understood to refer to a cavity inside said film package. Taken together, the film layers preferably form a film composite, which together forms film product and completely encloses the packaging space. In this context, the sealing seam may be straight line or may describe a curved line.

It is possible that in a film package according to the present invention the package space is filled with an item of food, particularly an oil-containing liquid, and/or a combustible liquid. It is also conceivable within the scope of the invention for the package to contain different liquids, particularly a multi-phase filling. An oil-containing liquid is understood to refer in particular to edible oil, for example olive oil. A food item is particularly understood to mean a substance suitable for human consumption.

With a film package according to the invention, at least part of said film layer may comprise a film product according to the invention. It is also possible that with a film package according to the invention the film product has been prepared in a process according to the invention. Consequently, a film package according to the invention offers the same advantages as have been explained in detail with reference to a film product according to the invention and with reference to an inventive method.

BRIEF DESCRIPTION OF THE DRAWINGS

The present invention will be explained in greater detail with reference to the accompanying figures of the drawing. The terms "left", "right", "top" and "bottom" used in this section refer to an alignment of the drawing figures with human-readable numerals. In the schematic drawing:

FIG. 3a is a partial view of a film product according to the invention, FIG. 3b is the partial view of FIG. 3a under different temperature conditions, FIG. 4a is a partial view of a film product according to the invention, FIG. 4b is an enlarged detail from FIG. 4a under different temperature conditions.

DESCRIPTION OF SPECIFIC EMBODIMENTS OF THE INVENTION

Figure 1:
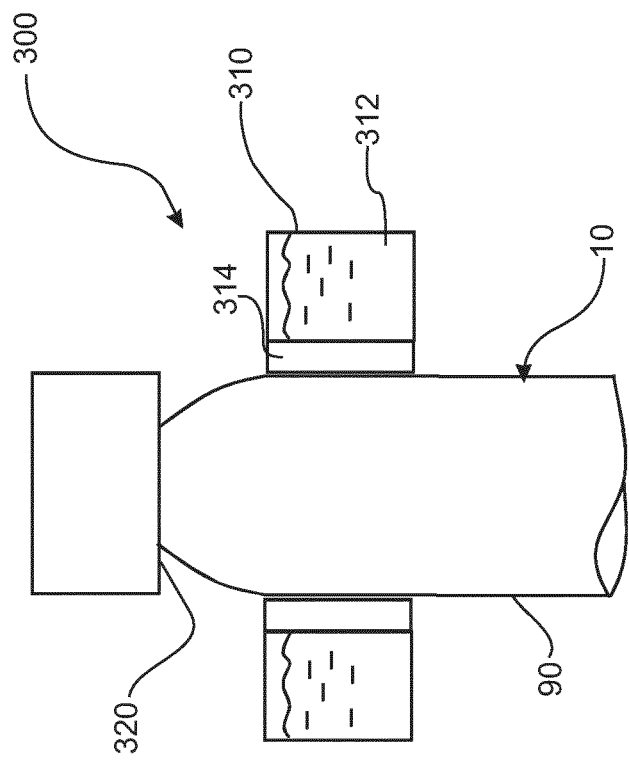
FIG. 1 is a schematic side view of an upside-down-wet-process of a method according to the invention.

FIG. 1 is a schematic representation of one possible configuration for producing a film product 10 according to the invention in a method according to the invention. For this purpose, an extrusion moulding system 300 having a die 320 is provided. Various film layers are extruded one on top of the other through said die 320 in a co-extrusion process. The tubular film or extrusion mould thus produced emerges as the finished film product 10 and is transported from the top down.

From the outside, a water cooling system 310 is disposed in a ring around film product 10. It encloses coextrusion mould 90, as it were. Said water cooling system 310 contains cooling water 312, which may come into direct contact with the extrusion mould 90 through a cooling gap 314. In this way, the newly prepared film product 10 from extrusion mould 90 may be cooled immediately after exiting die 320 and particularly at shock rate. Cooling is carried out preferably using cold water at about 5° C. to 45° C., so that a final end temperature below about 100° C. is reached by coextrusion mould 90.

The result of such shock cooling in asymmetric films is shown in FIGS. 3a to 4b for example. FIG. 3b illustrates how the two foil layers 20a and 20b behave with respect to one another immediately after exiting the die, for example. If cooling takes place slowly, the two film layers 20a and 20b cool differently from each other, and a corresponding change in dimension of the film layers 20a and 20b relative to one other is produced, as shown in FIG. 3b. However, since the two foil layers 20a and 20b are extruded together with one another, they form a compound structure so that, this unequal dimensional change results in film product 10 rolling up, as shown in FIG. 4a. This tendency to roll up is also called the curl effect.

Now, if water cooling, particularly shock cooling is applied as shown in FIG. 1 according to the present invention, for example, the dimensional change does not take place. Rather, film product 10 is frozen as it were in the manner shown in FIG. 3a. Accordingly, as shown in FIG. 4b, for example, the absence of this dimensional change also means that there is no thermally induced stress, so the curl effect or tendency to roll up is reduced or does not occur at all.

Figure 2:
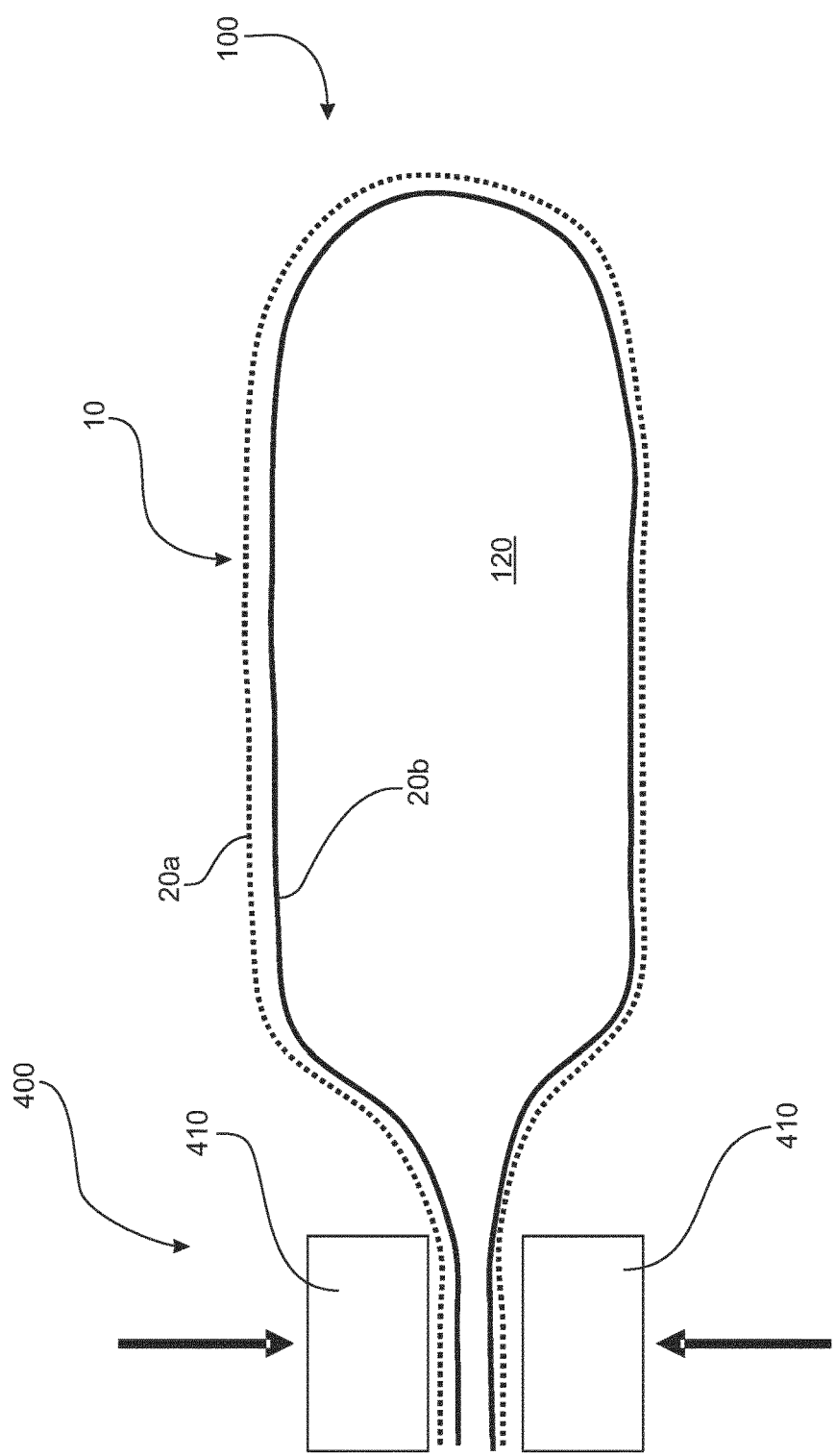
FIG. 2 shows an embodiment when sealing a film product according to the invention.

Since film product 10 that may then be produced is smoother, and particularly has improved flatness, it also has improved running characteristics in an "FFS machine" (form, fill and seal machine). The critical process in such a machine is the sealing operation, as is shown in FIG. 2, for example. This shows a sealing apparatus 400 having two sealing jaws 410. For illustrative purposes, a film product 10 shown schematically, and is already in the form of a bag-type film package 100. Reservoir 120 may be filled with a product, e.g., a liquid 200. Outer film layer 20a is thermally stable, and inner film layer 20b is heat-sealable. If the sealing operation is carried out with sealing jaws 410, the two sealing jaws 410 are moved toward one another. They are heated to a sealing temperature and this temperature is transferred to the material of film product 10. This temperature is preferably below the melting temperature of thermally stable film layer 20a, and is sufficient to fuse or melt heat-sealable film layer 20b. By melting and fusing, the two inner film layers 20b are fused together, so that a cohesive bond with a sealing seam is formed. At the same time thermally stable outer film layer 20a protects sealing jaw 410 from being contaminated with molten material. Accordingly, sealing jaws 410 may be used directly and do not have to be covered with protection such as a Teflon strip.

Figure 5A:
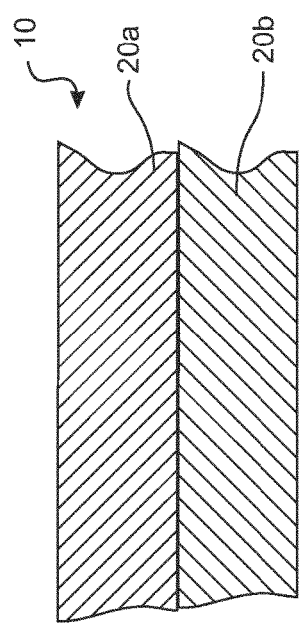
FIG. 5a shows an embodiment of a film product according to the invention.
Figure 5B:
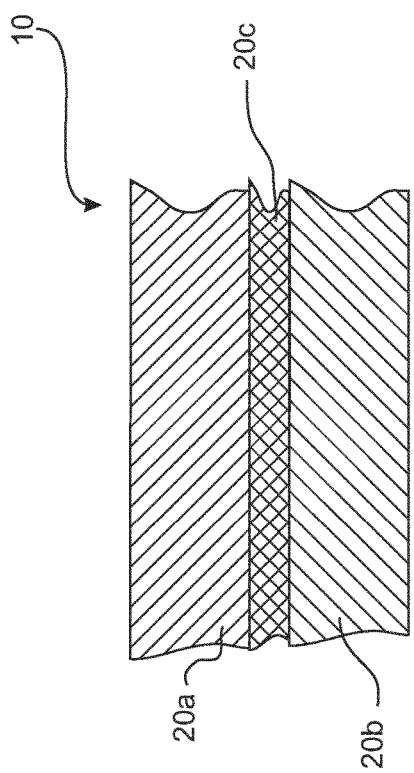
FIG. 5b shows a further embodiment of a film product according to the invention.
Figure 5C:
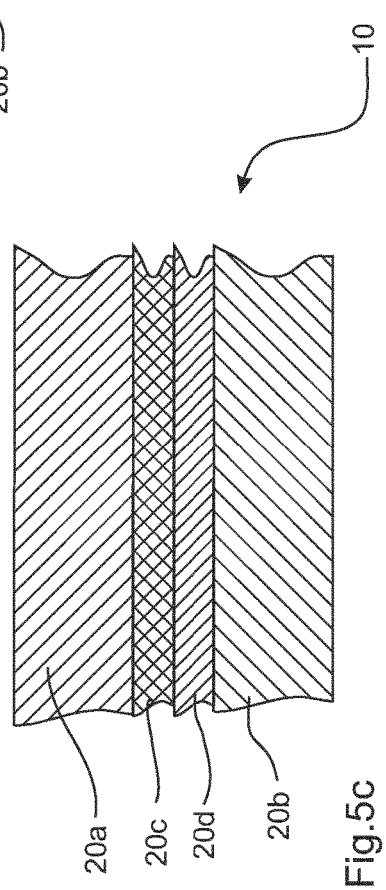
FIG. 5c shows a further embodiment of a film product according to the invention.

FIGS. 5a to 5c show various embodiments of a film product 10 according to the invention. In the simplest form thereof, film product 10 has only two film layers 20a and 20b, which have been produced together by co-extrusion. This is shown in FIG. 5a, wherein film layer 20a faces outwards and is thermally stable, while inner film layer 20b is designed to be heat sealable.

FIG. 5b shows a variant in which an additional adhesion promoting layer 20c is provided between the two outer film layers 20a and 20b. This adhesion promoting layer 20c serves particularly to ensure that the two outer film layers 20a and 20b may be bonded together permanently and securely as desired, even if the combination of materials does not favour such a bond.

In FIG. 5c shows an exemplary embodiment in which an additional film layer 20d is provided, having an additional property, for example. This extra film layer 20d is preferably located between an adhesion promoting layer 20c and the heat sealable film layer 20b. Of course, a plurality of additional film layers 20d can also be used, each of which has/have one or more additional properties, e.g., with regard to barrier properties or further processing characteristics.

Figure 6:
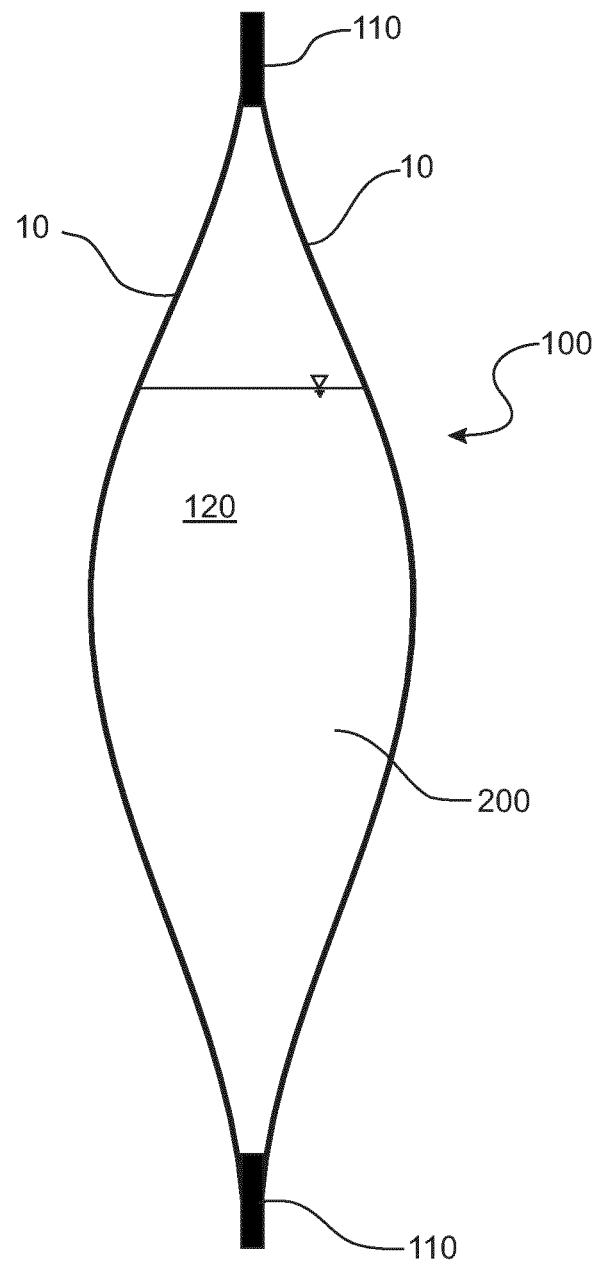
FIG. 6 shows a further embodiment of a film product and film package according to the invention.

FIG. 6 shows an embodiment of a film package 100 according to the invention. This comprises film products 10, which together enclose a packaging space 120 in the manner of a pouch. Said packaging space 120 is at least partly filled with liquid 200, and is sealed at the top and bottom with a sealing seam 110. These sealing seams are created for example in a method such as is shown in FIG. 2 for example.

The preceding explanations of the embodiments describe the present invention only in the context of examples. Of course, individual features of the embodiments may be combined with each other in any technically practicable permutation without departing from the scope of the present invention.

| List of reference signs | |
|---|---|
| 10 | Film product |
| 20a | Thermally stable film layer |
| 20b | Sealable film layer |
| 20c | Adhesion promoting layer |
| 20d | Additional film layer |
| 90 | Coextrusion mould |
| 100 | Film package |
| 110 | Sealing seam |
| 120 | Packaging space |
| 200 | Liquid |
| 300 | Extrusion blow moulding apparatus |
| 310 | Water cooling |
| 312 | Coolant water |
| 314 | Cooler gap |
| 320 | Die |
| 400 | Sealing device |
| 410 | Sealing jaw |

The invention claimed is:

1. A method for producing an asymmetric film product (10), the method comprising:
 obtaining a sealed asymmetric film product (10) by forming a molten film for completely enclosing a package space (120) in a liquid-tight manner and sealing the package space with a liquid-tight sealing seam, said forming is performed by:
 coextrusion blow moulding of a first film layer (20b) that faces inwardly toward the package space (120) and a second film layer (20a) that faces outwardly from the package space (120), using a coextrusion die (320) and a coextrusion mould (90),
 cooling said first and second layers (20a, 20b) while enclosed in said coextrusion mould by passing said first and second layers and said coextrusion mould through a ring shaped water cooling system (310) having a cooling gap (314) between an inner surface of said ring shaped water cooling system and an outer surface of said coextrusion mould, wherein said inner surface of said ring shaped cooling system and said cooling gap allow for cooling water (312) from said ring shaped water cooling system to come into direct contact with said outer surface of said coextrusion mould, and;
 wherein the second film layer (20a) comprises a thermally stable polyamide with a melting temperature between about 130° C. and about 220° C.;
 wherein the first film layer (20b) comprises a sealable material having polyethylene with a melting temperature between about 90° C. and about 120° C.;
 wherein said cooling is performed at a shock rate which cools said first and second layers from a temperature between about 180° C. and about 260° C. at the exit point from said coextrusion die (320) to a temperature between about 40° C. and about 70° C. at an exit point from said ring shaped water cooling system;
 wherein said cooling water (312) contains surfactants; and wherein the cooling water (312) is in a temperature range between about 5° C. and about 45° C.

2. The method according to claim 1, wherein an exchange of air is carried out inside the coextrusion mould (90).

3. The method according to claim 1, wherein cooling inside the coextrusion mould (90) is performed by air.

4. The method according to claim 1, wherein the film product (10) is used for packing liquids (200), pasty and/or pourable materials, in sealed film packages (100); wherein as a result of the cooling no thermally induced stresses are created in the film product (10).

5. The method according to claim 1, wherein said surfactants comprise detergents.

6. The method according to claim 1, wherein the cooling water (312) is modified by the addition of said surfactants in combination with at least one of softened water and demineralised water.

7. The method according to claim 1, wherein as a result of said cooling no thermally induced stresses are created in the film product (10).

8. The method according to claim 7, wherein the package space (120) is filled with a food item.

9. The method according to claim 8, wherein the food item is selected from a group consisting of an oil-containing liquid and a combustible liquid.

10. The method according to claim 1, wherein the liquid-tight sealing seam is a straight line.

11. The method according to claim 1, wherein the liquid-tight sealing seam is a curved line.

12. The method according to claim 1, wherein said first and second film layers (20a, 20b) having different melting points.

13. The method according to claim 12, wherein a water-cooled coextrusion blow moulding process comprises cooling said first and second film layers (20a, 20b) of said film product (10) immediately after exiting said coextrusion die (320) used for coextrusion blow moulding.

14. A method for producing an asymmetric film product (10), the method comprising:
 obtaining a sealed asymmetric film product (10) by forming a molten film for completely enclosing a package space (120) in a liquid-tight manner and sealing the package space with a sealing seam, said forming is performed by:
 coextrusion blow moulding of a first film layer (20b) that faces inwardly toward the package space (120) and a second film layer (20a) that faces outwardly from the package space (120), using a coextrusion die (320) and a coextrusion mould (90),
 cooling said first and second layers (20a, 20b) while enclosed in said coextrusion mould by passing said first and second layers and said coextrusion mould through a ring shaped water cooling system (310) having a cooling gap (314) between an inner surface of said ring shaped water cooling system and an outer surface of said coextrusion mould, wherein said inner surface of said ring shaped cooling system and said cooling gap allow for cooling water (312) from said ring shaped water cooling system to come into direct contact with said outer surface of said coextrusion mould, and
 wherein the second film layer (20a) comprises a thermally stable polyamide with a melting temperature between about 130° C. and about 220° C.;
 wherein the first film layer (20b) comprises a sealable material having polyethylene with a melting temperature between about 90° C. and about 120° C.;
 wherein said cooling is performed at a shock rate which cools said first and second layers from a temperature between about 180° C. and about 260° C. at the exit point from said coextrusion die (320) to a temperature between about 40° C. and about 70° C. at an exit point from said ring shaped water cooling system;
 wherein said cooling water (312) contains surfactants;
 wherein the cooling water (312) is in a temperature range between about 5° C. and about 45° C.; and wherein the sealing seam is a straight line.

15. A method for producing an asymmetric film product (10), the method comprising:

obtaining a sealed asymmetric film product (10) by forming a molten film for completely enclosing a package space (120) in a liquid-tight manner and sealing the package space with a sealing seam, said forming is performed by:

coextrusion blow moulding of a first film layer (20*b*) that faces inwardly toward the package space (120) and a second film layer (20*a*) that faces outwardly from the package space (120), using a coextrusion die (320) and a coextrusion mould (90), cooling said first and second layers (20*a*, 20*b*) while enclosed in said coextrusion mould by passing said first and second layers and said coextrusion mould through a ring shaped water cooling system (310) having a cooling gap (314) between an inner surface of said ring shaped water cooling system and an outer surface of said coextrusion mould, wherein said inner surface of said ring shaped cooling system and said cooling gap allow for cooling water (312) from said ring shaped water cooling system to come into direct contact with said outer surface of said coextrusion mould, and wherein the second film layer (20*a*) comprises a thermally stable polyamide with a melting temperature between about 130° C. and about 220° C.;

wherein the first film layer (20*b*) comprises a sealable material having polyethylene with a melting temperature between about 90° C. and about 120° C.;

wherein said cooling is performed at a shock rate which cools said first and second layers from a temperature between about 180° C. and about 260° C. at the exit point from said coextrusion die (320) to a temperature between about 40° C. and about 70° C. at an exit point from said ring shaped water cooling system;

wherein said cooling water (312) contains surfactants;

wherein the cooling water (312) is in a temperature range between about 5° C. and about 45° C.; and wherein the sealing seam is a curved line.

\* \* \* \* \*

UNITED STATES PATENT AND TRADEMARK OFFICE
CERTIFICATE OF CORRECTION

PATENT NO. : 10,046,896 B2
APPLICATION NO. : 14/365632
DATED : August 14, 2018
INVENTOR(S) : Ingo Putsch et al.

Page 1 of 1

It is certified that error appears in the above-identified patent and that said Letters Patent is hereby corrected as shown below:

On the Title Page

Item (30) Insert the following:
-- Dec. 15, 2011 (EP)………………….11193817.1 --

Signed and Sealed this
Twenty-third Day of October, 2018

Andrei Iancu
*Director of the United States Patent and Trademark Office*